(12) United States Patent
Iijima et al.

(10) Patent No.: US 7,098,629 B2
(45) Date of Patent: Aug. 29, 2006

(54) GENERATOR APPARATUS

(75) Inventors: Yoshihiro Iijima, Saitama (JP);
Katsumi Maruyama, Saitama (JP);
Takahiro Ideguchi, Saitama (JP);
Yoshinori Nakagawa, Saitama (JP);
Toshio Inoue, Saitama (JP); Junichi Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/135,282

(22) Filed: May 24, 2005

(65) Prior Publication Data
US 2005/0264265 A1  Dec. 1, 2005

(30) Foreign Application Priority Data
May 25, 2004 (JP) ............................... 2004-154779
Dec. 22, 2004 (JP) ............................... 2004-371032

(51) Int. Cl.
*H02H 7/06* (2006.01)
*H02P 11/00* (2006.01)
*H02P 9/00* (2006.01)

(52) U.S. Cl. ......................................... 322/25; 322/44
(58) Field of Classification Search .................. 322/44, 322/38, 25, 24, 20, 46
See application file for complete search history.

(56) References Cited

U.S. PATENT DOCUMENTS 4,682,044 A * 7/1987 Hotate et al. ............. 290/40 B
5,210,480 A * 5/1993 Iwatani et al. ................. 322/28
5,656,922 A * 8/1997 LaVelle et al. ............... 322/46
5,672,954 A * 9/1997 Watanabe ..................... 322/28
5,675,238 A * 10/1997 Asao ........................... 322/28
5,686,819 A * 11/1997 Iwatani et al. ................. 322/25
2005/0264266 A1* 12/2005 Nakagawa et al. ........... 322/25
2005/0264961 A1* 12/2005 Ogawa et al. ................. 361/20

FOREIGN PATENT DOCUMENTS

JP          2511843          7/1996

* cited by examiner

*Primary Examiner*—Julio Gonzalez
(74) *Attorney, Agent, or Firm*—Westerman, Hattori, Daniels & Adrian, LLP.

(57) ABSTRACT

A generator apparatus can provide generated power fit for a connected battery, and even if a load voltage is not within a suitable range, when the load voltage is a certain level or more, the generator can provide power. A selector 25 selects a target voltage for controlling the output voltage of a rectifier 2. An output controller 34 controls the rectifier 2 according to the target. A load judgment section 35 judges the terminal voltage of a battery 19. When the terminal voltage is within an allowable range with respect to the target value, permission for output is given to the output controller 34. When the load voltage is not within the allowable range, an alarm is raised. Even when the alarm is raised, if a load voltage develops which is not less than a predetermined voltage lower than the allowable range, the battery 19 can be charged by forced-output.

7 Claims, 6 Drawing Sheets

| TARGET VALUE Vref (SWITCH POSITION) | LOAD VOLTAGE VL | OUTPUT PERMISSION/ PROHIBITION | OUTPUT INDICATING LIGHT | ABNORMALITY (OVERLOAD) INDICATING LIGHT |
|---|---|---|---|---|
| 36V | VL<27V | PROHIBITION | TURNED OFF | TURNED OFF |
| | 27V<VL<42V | PERMISSION | TURNED ON | TURNED OFF |
| | 42V<VL<55V | PROHIBITION | TURNED OFF | BLINKED |
| 48V | VL<27V | PROHIBITION | TURNED OFF | TURNED OFF |
| | 27V<VL<42V | PROHIBITION | TURNED OFF | BLINKED |
| | 42V<VL<55V | PERMISSION | TURNED ON | TURNED OFF |

| TARGET VALUE Vref (SWITCH POSITION) | LOAD VOLTAGE VL | OUTPUT PERMISSION/ PROHIBITION | OUTPUT INDICATING LIGHT | ABNORMALITY (OVERLOAD) INDICATING LIGHT |
|---|---|---|---|---|
| 36V | VL≦2V | PROHIBITION | TURNED OFF | TURNED OFF |
|  | 2V<VL<27V | FORCED-OUTPUT PERMISSION | TURNED OFF | BLINKED |
|  | 27V<VL<42V | OUTPUT | TURNED ON | TURNED OFF |
|  | 42V<VL<55V | PROHIBITION | TURNED OFF | BLINKED |

Fig. 9

| TARGET VALUE Vref (SWITCH POSITION) | LOAD VOLTAGE VL | OUTPUT PERMISSION/ PROHIBITION | OUTPUT INDICATING LIGHT | ABNORMALITY (OVERLOAD) INDICATING LIGHT |
|---|---|---|---|---|
| 48V | VL≦2V | PROHIBITION | TURNED OFF | TURNED OFF |
|  | 2V<VL<42V | FORCED-OUTPUT PERMISSION | TURNED OFF | BLINKED |
|  | 42V<VL<55V | OUTPUT | TURNED ON | TURNED OFF |

GENERATOR APPARATUS

BACKGROUND OF THE INVENTION

1. Field of the Invention

The present invention relates to a generator apparatus and, in particular, to a generator apparatus capable of outputting a comparatively large direct current and detecting the occurrence of an abnormality with ease.

2. Description of the Related Art

A generator apparatus having a generator which is driven by an engine or the like has been conventionally widely employed as the power supply of an electric appliance especially used for outdoor works and for leisure-time activities. Further, in recent years, the uses of the generator apparatus are spreading also to the back-up power supply, that is, the so-called uniterruptible power supply (UPS) for computers and the like. When the generator apparatus of this kind is constructed as a generator apparatus for outputting a direct current, there is a tendency that the generator is required to be small in size and to be able to output a comparatively low voltage and a large current. In the generator required to output a large current like this, a larger size of wire for an output winding is needed and a higher level of consideration is required to be given also to a dielectric breakdown voltage between windings and a material for insulator.

Hence, the present applicant proposed a generator apparatus that could be reduced in the wire diameter of an output winding and could be reduced in the capacity of a power device (Japanese Utility Model Registration No. 2511843). In a device in accordance with this registered utility model, a plurality of power supply units independent of each other are formed, respectively, of a plurality of output windings that are wound independently of each other around the same iron core and thyristor bridge rectifier circuits connected to the plurality of output windings, and the outputs of the power supply units are connected in parallel, thereby being integrated into one output.

When the generator apparatus disclosed in the above-described patent document is used for charging a battery, that is, when a battery is connected as a load of the generator, a charging voltage needs to be changed according to the voltage specification of the battery. For this reason, it is thought that a selector switch is provided to change the output of the generator for each battery to be connected. However, it is complicated to check the voltage specification and to operate the selector switch every time a battery is connected. Further, if an operation of changing output is performed by mistake, the battery is excessively charged or cannot be sufficiently charged.

SUMMARY OF THE INVENTION

The object of the present invention is to provide a generator apparatus capable of preventing a battery from being excessively charged or from being insufficiently charged by operating a battery voltage selecting switch by mistake.

The present invention to achieve the above object is a generator apparatus that converts an alternating current outputted from the output windings of a generator to a direct current by rectifier circuits to output the direct current to an output terminal and has the first characteristic in that generator includes: selecting means that selects a value of output voltage of the rectifier circuit; load voltage detecting means that detects the voltage of load connected to the output terminal, for example, the voltage of a battery to be charged; and load judgment means that enable to start providing the output of the rectifier circuit when the voltage of load is within a load voltage range set in correspondence with the set value of output voltage, which is selected by the selecting means.

The present invention has the second characteristic in that the generator further includes a forced-output switch that enable to forcibly provide the output of the rectifier circuit to the output terminal when the voltage of load is lower than a predetermined load voltage range.

Further, the present invention has the third characteristic in that the forced-output switch is a switch that enable to forcibly provide the output of the rectifier circuit to the output terminal when the voltage of load is a voltage not less than a set value lower than the load voltage range.

Still further, the present invention has the fourth characteristic in that the forced-output switch is a self-returned press button switch that enable to provide the output of the rectifier circuit to the output terminal by means of a previously set number of operations.

Still further, the present invention has the fifth characteristic in that the generator further includes means that raise an alarm when the load judgment means does not judge that the voltage of load is within the load voltage range.

Still further, the present invention has the sixth characteristic in that the output windings are a plurality of windings wound around a single iron core independently of each other, and in that the rectifier circuits include rectifier devices with control terminals connected to the plurality of output windings, and in that the generator further includes control means that controls the output voltage of each rectifier circuit converges on the set value of output voltage, which is selected as a target value.

According to the present invention, only when the voltage of the connected load, for example, the voltage of a battery connected as a load is within a predetermined range set for the set value of output voltage, which is selected by a selector switch, an output can be supplied to the load from a rectifier circuit. Hence, the output is not started in a state where the output voltage does not fit for the voltage of the load, for example, when the load is a battery, even if the selector switch is operated by mistake, the battery can be prevented from being charged at an output voltage not matching the battery, whereby the battery can be prevented from being excessively charged or insufficiently charged.

Further, the load voltage is judged according to the load voltage range but even if the terminal voltage of the battery is different to some extent from the load voltage range because of the depth of discharge of the battery, it is considered that the output voltage matches the load.

Still further, even if the battery is heavily discharged to decrease the terminal voltage to a lower level, the operator can try to charge the battery as required. Moreover, when a specified battery is not available but a battery is used in emergency in place of the specified battery, even if a voltage drop is large because of a difference in the discharge characteristic, the battery is operated as a relief, thereby being charged.

According to the present invention, because it is possible to check that a load exits, it is possible to avoid a forced output in the state of failure such as short circuit or in a state where the battery is not connected. Only when the operator operates a switch with an intention of forced output, the forced output can be performed. Hence, it is possible to prevent an output by a wrong operation.

According to the present invention, when the voltage of the load is not within a predetermined range with respect to the set value of output voltage, the operator can easily recognize by alarm light or alarm sound informing that the set value of output voltage does not match the voltage of the load. Therefore, the operator of the generator apparatus can take suitable measures, for example, switch the selector switch again or replace the connected battery.

According to the present invention, in a construction in which an output of comparatively large current and low voltage is connected to a load, the output of the generator apparatus can be suitably changed in accordance with the load or a load suitable for the output of the generator can be connected to the generator apparatus.

DETAILED DESCRIPTION OF THE PREFERRED EMBODIMENTS

Figure 1:
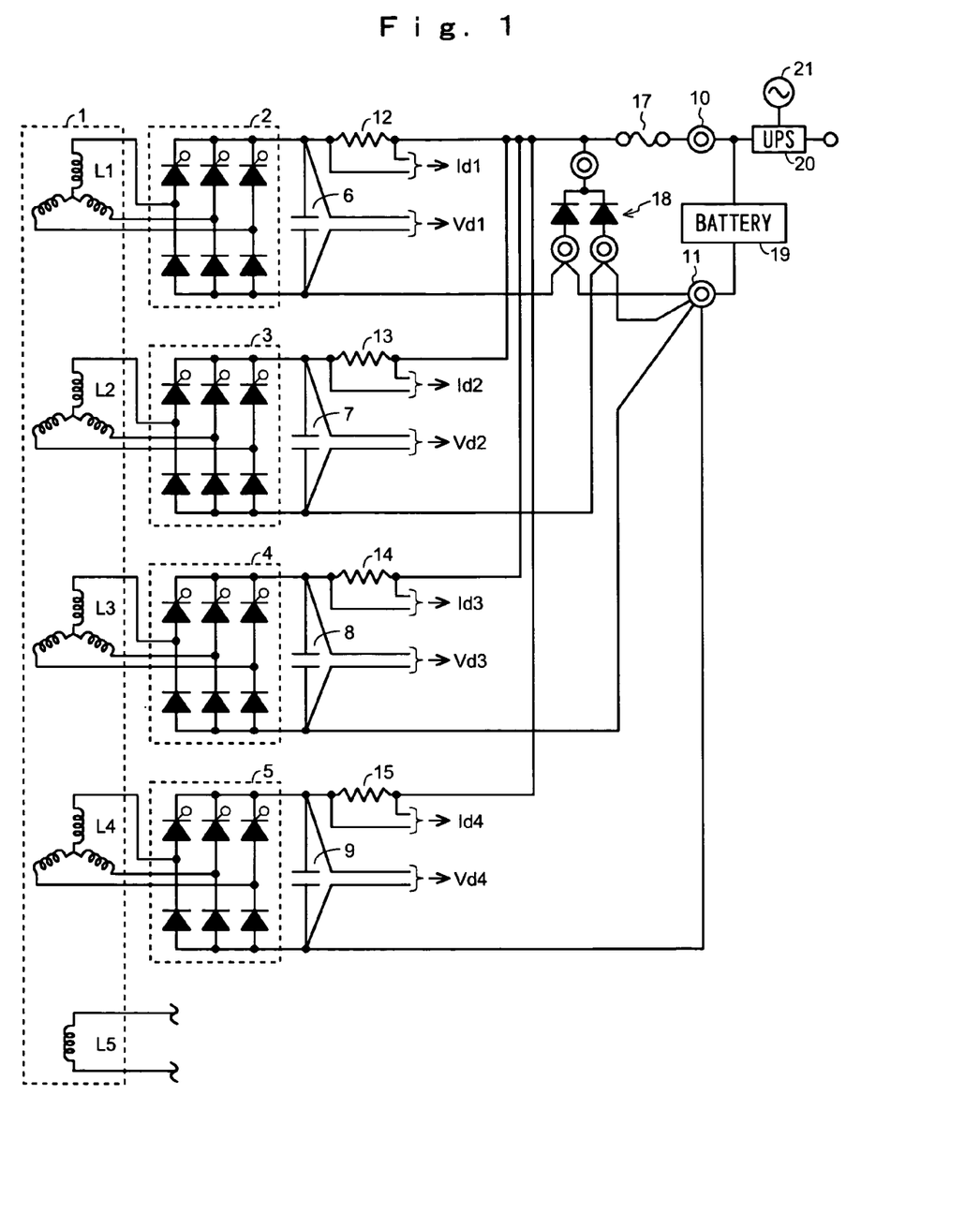
FIG. 1 is a connection diagram (No. 1) relating to the main portion of a portable generator apparatus in accordance with an embodiment of the present invention.

An embodiment of the present invention will be described below in detail with reference to the drawings. FIG. 1 is a construction diagram of the main portion of a portable generator apparatus in accordance with an embodiment of the present invention. In FIG. 1, the stator 1 of a generator body consists of four output windings L1, L2, L3, and L4 those are independent of each other and an auxiliary winding L5 independent of these output windings L1 to L4, wherein the four output windings L1, L2, L3, and L4 and the auxiliary winding L5 are wound around the protruding poles of a single stator iron core (not shown). The output windings L1 to L4 are equal to each other in the number of windings and in the diameter of the wire, that is, identical in specifications.

The stator 1 is disposed in the center of the generator body and a rotor having a plurality of magnets disposed annularly, that is, an outer rotor is commonly arranged on the outer periphery of the stator 1. The rotor is connected to a driving unit (that is here thought to be an engine) and is driven by the engine so as to rotate along the outer periphery of the stator 1.

The output windings L1, L2, L3, and L4 are connected to three-phase rectifier bridge circuits 2, 3, 4, and 5, respectively, each of which is constructed of rectifier devices having control terminals (thyristors) and diodes. Symbols showing the thyristors and the diodes in the drawing are well known and hence are not denoted by reference numerals for the purpose of avoiding the drawings from being complicated. Smoothing capacitors 6, 7, 8, and 9 are provided on the outsides of the three-phase rectifier bridge circuits 2, 3, 4, and 5, respectively. The plus-side output lines of the three-phase rectifier bridge circuits 2, 3, 4, and 5 are integrated into one line and connected to a plus-side output terminal 10 and the minus-side output lines thereof are integrated into one line and connected to a minus-side output terminal 11.

Shunts 12, 13, 14, and 15 are connected to the respective plus-side output lines before the plus-side output lines are integrated into one line. A potential difference across both ends of each of the shunts 12, 13, 14, and 15 is inputted as a signal showing each of output currents Id1, Id2, Id3, and Id4 of the three-phase rectifier circuits 2, 3, 4, and 5 to a microcomputer, that is, a controller 16 (see FIG. 2). A potential difference across both ends of each of the capacitors 6, 7, 8, and 9 is inputted as each of output voltages Vd1, Vd2, Vd3, and Vd4 of the three-phase rectifier circuits 2, 3, 4, and 5 to the controller 16.

A fuse 17 is provided in a line into which the respective plus-side output lines are integrated. The fuse 17 is selected so as to allow the maximum value of the added value of the respective output currents of the three-phase rectifier bridge circuits 2, 3, 4, and 5. A diode 18 is interposed between the upstream side of the fuse 17 of the one line, into which the plus-side output lines are integrated, and at least one line (two lines in the example shown in FIG. 1) of the four minus-side output lines. For example, when a battery 19 of a load is connected in reverse polarity by mistake, a current from a load side passes through one line, into which the output lines are integrated, via this diode 18. Hence, this can prevent a current from passing from a load connected in reverse polarity to the respective three-phase rectifier bridge circuits 2 to 5 having a smaller allowable current than this output lines.

The battery 19 and a UPS 20 are connected to the output terminal 10 on the plus side and the output terminal 11 on the minus side. The output side of the UPS 20 is connected to an electronic unit (not shown), for example, a computer system. A commercial AC power supply 21, for example, is connected to the UPS 20 and the battery 19 is always charged with this commercial AC power supply 21. The portable generator apparatus of the present embodiment is connected to the UPS 20 to supply the UPS 20 and the battery 19 with power in the event of a failure of the commercial AC power supply 21 or the like. Batteries of different rated voltages of 48 V and 36 V, for example, can be selectively connected as the battery 19.

Figure 2:
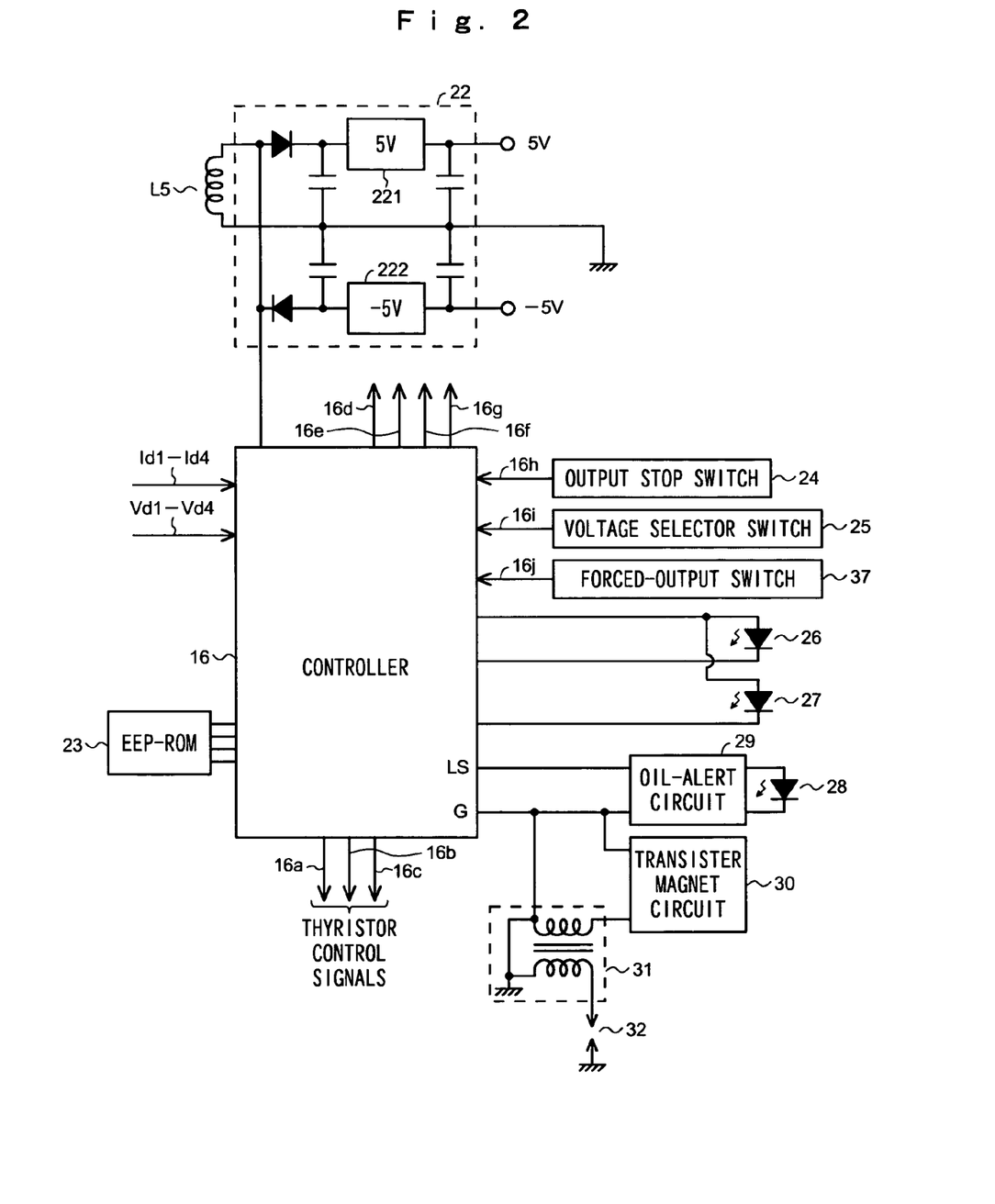
FIG. 2 is a connection diagram (No. 2) relating to the main portion of the portable generator apparatus in accordance with the embodiment of the present invention.

FIG. 2 is a connection diagram of a controller and its peripheral parts. The auxiliary winding L5 is connected to a constant-voltage circuit 22. The constant-voltage circuit 22 includes positive/negative (+5 V and −5 V) regulators 221, 222 with three terminals and generates DC power supply voltages stabilized at +5 V and −5 V by the voltage applied by the auxiliary winding L5. This DC power supply voltages are used as the power supply of the controller 16. Moreover, the output waveform of the auxiliary winding L5 is supplied as a signal for detecting the rotation of the rotor of the generator body to the controller 16. An EEP-ROM 23 for storing data used by the controller 16 is connected to the controller 16.

The controller 16 outputs thyristor control signals (gate pulses) 16a, 16b, and 16c for turning on and off the respective thyristors of each of the three-phase rectifier bridge circuits 2, 3, 4, and 5, as shown in FIG. 1. These gate pulses 16a, 16b, and 16c are supplied to the gate terminals, that is, the control terminals of the respective thyristors. Each of the three-phase rectifier bridge circuits 2, 3, 4, and 5 is provided with three thyristors corresponding to the respective phases U, V, and W of each of the output windings L1 to L4, and the thyristors corresponding to the respective phases are controlled by these gate pulses 16a, 16b, and 16c common to the three-phase rectifier bridge circuits 2, 3, 4, and 5. Hence, the three-phase rectifier bridge circuits 2, 3, 4, and 5 are controlled in synchronization with each other by the gate pluses 16a, 16b, and 16c.

To control the opening or closing of the throttle valve of the engine for driving the outer rotor by a stepping motor (not shown), the controller 16 outputs motor driving signals 16d, 16e, 16f, and 16g to this stepping motor.

An output stop switch 24 is a switch for stopping the portable generator apparatus in this embodiment from outputting generated power. When this output stop switch 24 is held pressed for a predetermined time, the gate pulses 16a, 16b, and 16c are stopped by the ON signal 16h of this switch 24, whereby the outputting of power is stopped. However, only the outputting of the generated power is stopped by this operation of the output stop switch 24 and the engine is not stopped only by the operation of this output stop switch 24.

A voltage selector switch 25 is a switch for setting an output voltage according to a connected load (battery 19 or the like). For example, when the voltage selector switch 25 is turned ON (selecting signal 16i is ON), a voltage of 36 V is set as an output voltage, and when the voltage selector switch 25 is turned OFF (selecting signal 16i is OFF), a voltage of 48 V is set as an output voltage.

There are provided an output indicating light 26, an overload indicating light 27, and an oil-alert indicating light 28. The oil-alert indicating light 28 is connected to the controller 16 through an oil-alert circuit 29. The output indicating light 26 is turned on while power is generated and outputted. The overload indicating light 27 is turned on in the case of an overload, that is, in the case of an over-current or an over-voltage.

There is provided a circuit section 30 of a transistor type magnet ignition unit. A well-known unit can be used as the main portion of the transistor type magnet ignition unit. The grounding line of the circuit section 30 of a transistor type magnet ignition unit and the grounding line of the oil-alert circuit 29 are connected to the terminal G of the controller 16. The other line of the circuit section 30 is connected to the coil part 31 of the ignition unit. An ignition plug 32 is connected to the secondary side of the coil part 31. The other terminal of the oil-alert circuit 29 is connected to the terminal LS of the controller 16. The terminals G and LS of the controller 16 are constructed to be short-circuited in the controller 16 so as to stop ignition.

A forced-output switch 37 is used for forcibly outputting the generated power of the generator apparatus (the meaning of "forcibly" will be described later). It is preferable that the forced-output switch 37 is a momentary switch, that is, a self-returned push button switch that is switched to an ON side only while the operator pushes it and is returned to an OFF side when the operator takes his hand off the push button. When the forced-output switch 37 is switched to the ON side, an ON signal 16j is inputted to the controller 16 and the controller 16 determines on the basis of this ON signal 16j whether or not the generator apparatus is permitted to output the generated power and permits the generator apparatus to output the generated power if predetermined conditions are satisfied.

The operation of the generator body will be described. The generator is started by the use of a recoil starter coupled to the engine of the driving source of the generator. When the recoil starter is pulled, the crankshaft of the engine is rotated and hence the rotor coupled to the crankshaft is rotated to develop a voltage in the auxiliary winding L5, and this voltage develops a predetermined voltage in the constant-voltage circuit 22. When the controller 16 has this voltage applied thereto, the controller 16 can start a controlling operation.

When the engine is rotated by the recoil starter, the engine is ignited by the ignition unit, whereby the generator is started. The windings L1 to L4 and L5 of the generator start generating power and the generated powers are integrated and outputted as generated power from the output terminals 10, 11. This power is supplied to the battery 19 and the UPS 20.

When the generated power is outputted, the output indicating light 26 is energized. Further, in the event of an over-current or an over-voltage, the overload indicating light 27 is energized. Still further, when it is determined by a well-known method that the oil of the engine is decreased to a level lower than a predetermined required value, the oil-alert circuit 29 is operated to energize the oil-alert indicating light 28. For example, the oil-alert circuit 29 is a switching circuit constructed such that a current passes through the oil-alert indicating light 28 according to a signal from the terminal LS. Further, when the oil decreases or an abnormality occurs in the power generating system, which will be described later, the controller 16 short-circuits the terminals LS and G in the controller 16 to stop igniting.

In this embodiment, the outputs of four power generating sections (power supply units) each including the windings and the rectifier circuit are integrated, that is, superimposed to the final output. Then, to conveniently charge a battery 19 of a different voltage specification by this integrated output, the following control means is provided.

Figure 3:
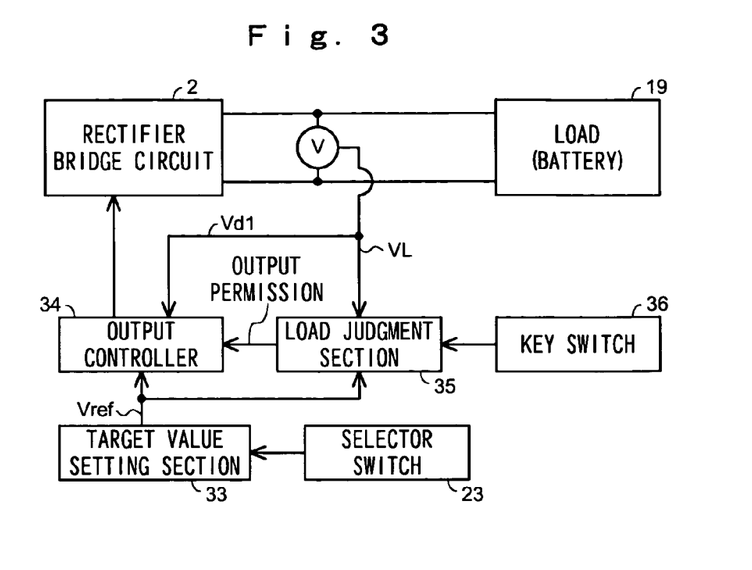
FIG. 3 is a block diagram showing the main function of a control section of the portable generator apparatus in accordance with the embodiment of the present invention.

FIG. 3 is a block diagram showing the function of a controller 16 for supplying an output suitable for the voltage specification of a battery. Because three-phase rectifier bridge circuits 2, 3, 4, and 5 are controlled at the same time, the function of these three-phase rectifier bridge circuits 2, 3, 4, and 5 will be described by representing the function of the three-rectifier bridge circuit 2. A target value Vref of the output voltage Vd1 of the three-phase rectifier bridge circuit 2 is previously set and stored in a target value setting section 33. The target value Vref is selected by switching a voltage selector switch 25. An example will be described in which a voltage of 36 V or a voltage of 48 V can be selected as a target value, but it is not limited to this two steps of target value setting. An output control device 34 outputs a gate pulse for controlling the thyristors of the three-phase rectifier bridge circuit 2 such that the output voltage Vd1 of the three-phase rectifier bridge circuit 2 converge at the target value Vref supplied from the target value setting section 33.

A load judgment section 35 compares the voltage (load voltage) VL of the battery 19 as a load charged by the three-phase rectifier bridge circuit 2 with the target value Vref of the voltage set in the target value setting section 33 to judge whether or not the load voltage VL is within a predetermined range (described later) with reference to the target value Vref. The voltages Vd1 and VL show the same voltage but a voltage after the start of output by the three-phase rectifier bridge circuit 2 is denoted by the voltage Vd1 and a voltage when the battery is held connected and the three-phase rectifier bridge circuit 2 does not yet start outputting is denoted by the voltage VL. When a key switch (main switch) 36 is switched to a position for directing the start of output and the load voltage VL is within a predetermined range including the voltage target value Vref, the load judge section 35 supplies the output controller 34 with an output permission.

When the load judgment section 35 judges that the load voltage VL is within the predetermined range including the voltage target value Vref, the three-phase rectifier bridge circuit 2 permits the start of output. When the load judgment section 35 judges that the load voltage VL is not within the predetermined range including the voltage target value Vref, the three-phase rectifier bridge circuit 2 prohibits output. Further, a device by which the operator can recognize the result of the load judgment section 35 can be provided.

Figure 4:
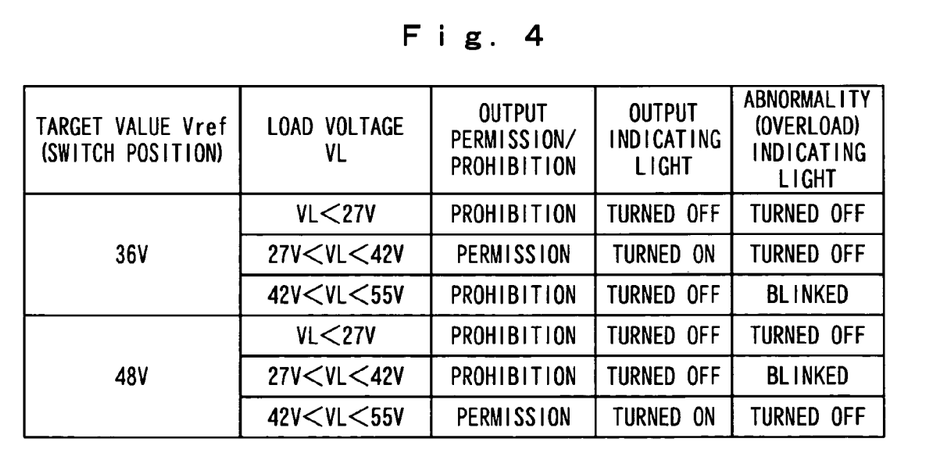
FIG. 4 shows examples of the output of a generator and a display according to a relationship between a load voltage and a set value of output voltage.

FIG. 4 is a table showing an example of display according to the result of the load judgment section 35. In the drawing, an abnormality indicating light may be a light designed specifically for displaying the result of the load judgment section 35, but in order to reduce the number of indicating lights, it is preferable to use, for example, the overload indicating light 27 as the abnormality indicating light. Hereafter, description will be provided on the assumption that the overload indicating light 27 is used as the abnormality indicating light.

When the target value Vref is 36 V, that is, the selector switch 25 is switched to a 36 V side, the following display is provided. When the load voltage VL is less than 27 V, the output of the three-phase rectifier bridge circuit 2 is prohibited and both of the output indicating light 26 and the overload indicating light 27 are turned off. Further, when the load voltage VL is within a range of from 27 V to less than 42, the output of the three-phase rectifier bridge circuit 2 is permitted. In this case, the output indicating light 26 is turned on and the overload indicating light 27 is held turned off. Still further, when the load voltage VL is within a range of from 42 V to 55 V, the output of the three-phase rectifier bridge circuit 2 is prohibited. In this case, the output indicating light 26 is turned off and the overload indicating light 27 is blinked to issue an alarm.

On the other hand, when the target value Vref is 48 V, that is, when the selector switch 25 is switched to a 48 V side, the following display is provided. When the load voltage VL is less than 27 V, the output of the three-phase rectifier bridge circuit 2 is prohibited and both of the output indicating light 26 and the overload indicating light 27 are turned off. Further, when the load voltage VL is within a range of from 27 V to less than 42 V, the output of the three-phase rectifier bridge circuit 2 is prohibited. In this case, the output indicating light 26 is turned off and the overload indicating light 27 is blinked to issue an alarm. Still further, when the load voltage VL is within a range of from 42 V to 55 V, the output of the three-phase rectifier bridge circuit 2 is permitted. In this case, the output indicating light 26 is turned on and the overload indicating light 27 is turned off.

In this regard, when the load voltage VL does not correspond to any above-described range of voltage irrespective of the position of the selector switch 25, the output indicating light 26 is held turned off and the overload indicating light 27 is blinked to issue an alarm.

Figure 5:
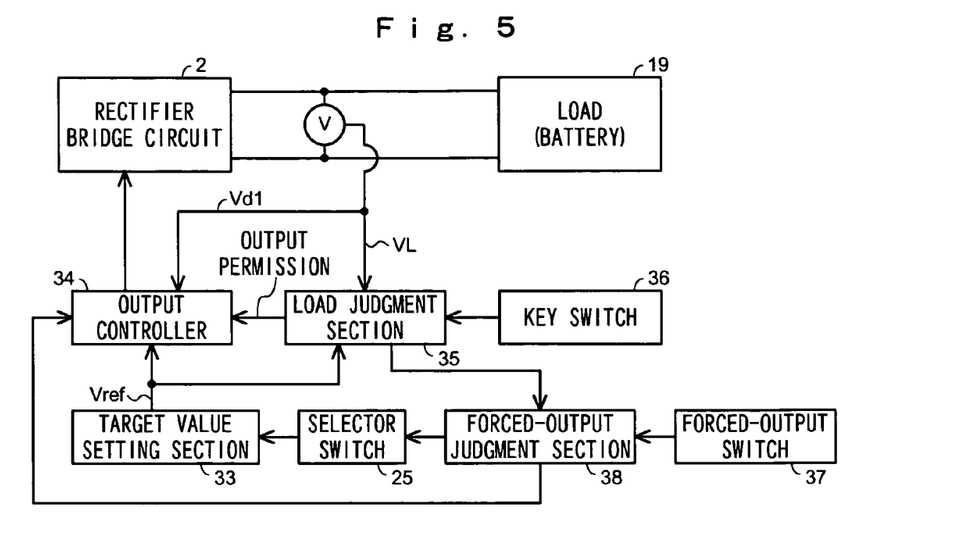
FIG. 5 is a block diagram showing the main function of a control section of the portable generator apparatus in accordance with the embodiment of the present invention.

FIG. 5 is a block diagram showing the function of a controller 16 in accordance with the second embodiment. The same reference symbols as in FIG. 3 denote the same or equivalent functions.

When it is determined by the load judgment section 35 that the load voltage VL is within the range of a forced-output permitting voltage, a forced-output judgment section 38 monitors the ON signal 16j of a forced-output switch 37. When the forced-output judgment section 38 judges on the basis of this ON signal 16j that the forced-output switch 37 is operated so as to forcefully output, the forced-output judgment section 38 supplies the output controller 34 with the permission of output.

Figure 6:
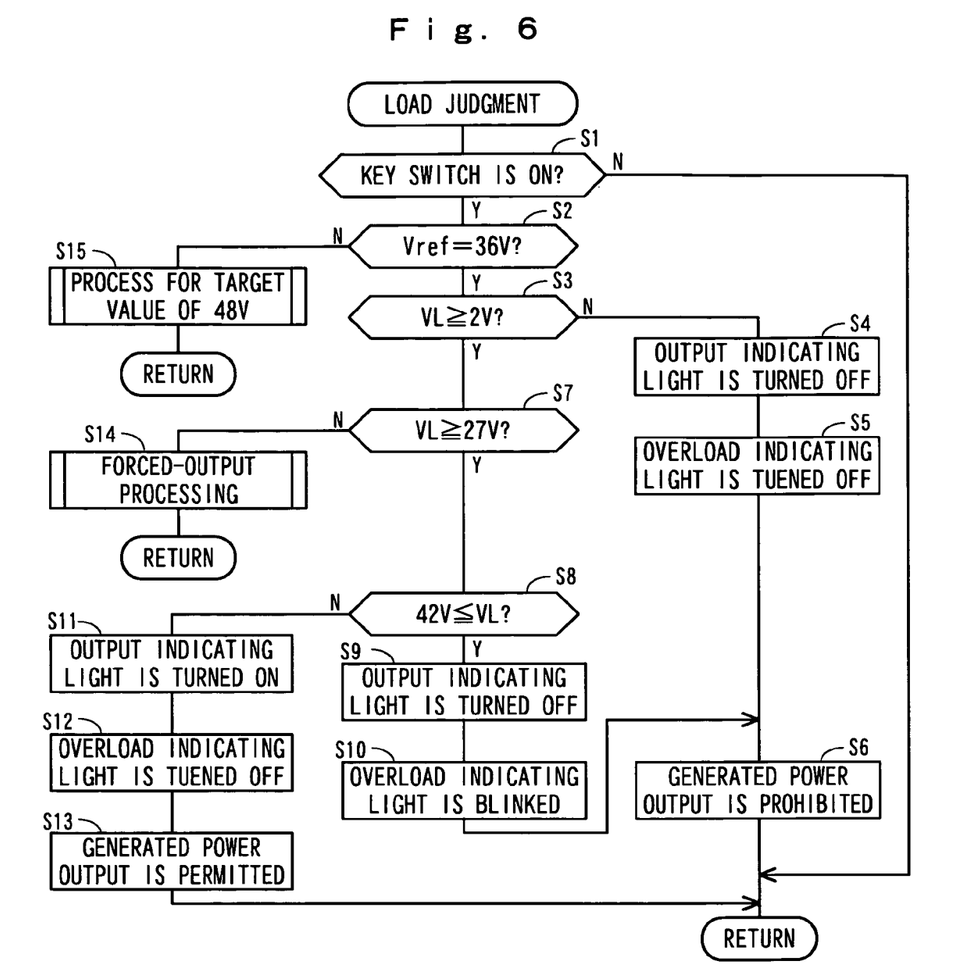
FIG. 6 is a flow chart of a load judgment processing.
Figure 7:
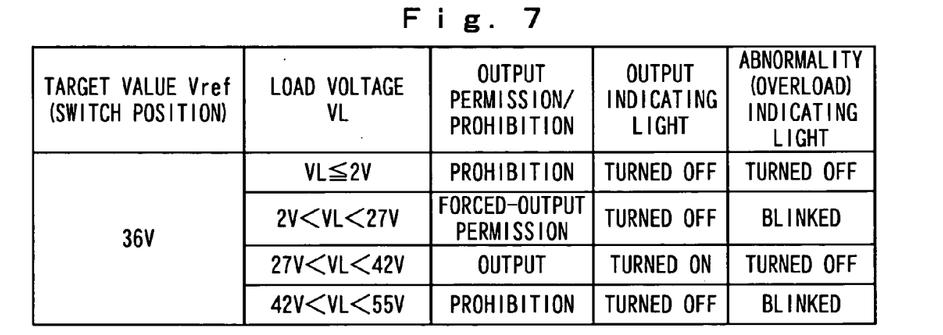
FIG. 7 shows examples of the output of a generator and a display according to a relationship between a load voltage and a set value of output voltage (36 V).

FIG. 6 is a flow chart showing the processing of the load judgment section 35 in the second embodiment and FIG. 7 shows the results of this processing. In FIG. 6, it is determined at step S1 whether or not the key switch 36 is ON and if the key switch 36 is ON, the routine proceeds to step S2. At step S2, it is determined whether or not the target value Vref of the output voltage is 36 V. If the target value Vref is 36 V, the routine proceeds to step S3. If the target value Vref is not 36 V, that is, is 48 V of the other target value, the routine proceeds to step S15. At step S15, a routine for 48V target value is processed. A detail of this routine described later.

At step S3, it is determined whether or not the load voltage VL is 2 V (first voltage) or more. If the load voltage VL is not 2 V (first voltage) or more, it is determined that the battery 19 is not connected or that the battery 19 is in a state where the battery is not suitable for being charged, for example, the battery 19 is excessively charged, and the output indicating light 26 and the overload indicating light 27 are turned off and generated power is prohibited (step S4, step S5, and step S6) to output. The results of the processing when the load voltage VL is less than a lower voltage set as the first voltage are shown in the uppermost line in FIG. 7. Here, the overload indicating light 27 serves as an abnormality indicating light 27 so as to reduce the number of indicating lights but a light designed solely for indicating the result of load judgment may be provided.

If the load voltage VL is 2 V or more, the routine proceeds to step S7 where it is determined whether or not the load voltage VL is 27 V (second voltage) or more. If the load voltage VL is 27 V or more, the routine proceeds to step S8 where it is determined whether or not the load voltage VL is 42 V (third voltage) or more. If the load voltage VL is 42 V or more, it is determined that an abnormality occurs and the routine proceeds to step S9 where the output indicating light is held turned off and then the routine proceeds to step S10 where the overload light 27 is blinked to issue an alarm and then the routine proceeds to step S6 where power generation is prohibited. The processing results when the load voltage VL is the third voltage or more are shown in the bottom line in FIG. 7.

If the determination result at step S7 is affirmative and the determination result at step S8 is negative, that is, if the load voltage VL is 27 V or more but is not 42 V or more, it is determined that a load, that is, the battery 19 corresponding to the output of the generator apparatus is connected. Then, the routine proceeds to step S11 where the output indicating light 26 is turned on and then the routine proceeds to step S12 where the overload indicating light 27 is turned off and the routine proceeds to step S13 where generated power is permitted to output. The processing results when the load voltage VL is between the second voltage and the third voltage are shown in the third line in FIG. 7.

If the determination result at step S7 is negative, that is, if the load voltage VL is 2 V or more but less than 27 V, the routine proceeds to step S14 where a forced-output processing is performed. This processing forcibly permits the generator apparatus to output power to charge the battery 19 even if it is determined in terms of load voltage VL that the battery 19 is not necessarily in a state of being most suitable for charging, that is, the battery 19 discharges a large quantity of electricity and hence largely decreases in a terminal voltage. The permission/prohibition of output and states of the indicating lights 26, 27 when the forced-output processing is performed are shown in the second line in FIG. 7.

The forced-output processing is summarized as follows. When the overload indicating light 27 is blinked and the generator apparatus is made to forcibly generate power in a state where the overload indicating light 27 is blinked, the following operation is performed. First, a forced-output switch 37 is held pressed to an ON side for the first predetermined time or more. In response to this operation, the overload indicating light 27 is turned off. With this, the operator can recognize that the load voltage VL is not less than the second voltage and less than the third voltage and that the generator apparatus can be permitted to generate power by a forced-output operation. In other words, the operator can recognize that the present state is not a state shown in the bottom line in FIG. 7 but in a state shown in the second line from a change in the state of the overload indicating light 27.

Then, the operator once returns the forced-output switch 37 to an OFF side (this switch 37 is a momentary type switch and hence automatically returns to the OFF side when the operator takes the hand off the switch). The operator again presses the forced-output switch 37 to the ON side before the second predetermined time passes from that time and keeps this ON state until the third predetermined time passes. With this operation of the switch 37, the output indicating light 27 is turned on and the generator apparatus is permitted to output generated power.

Figure 8:
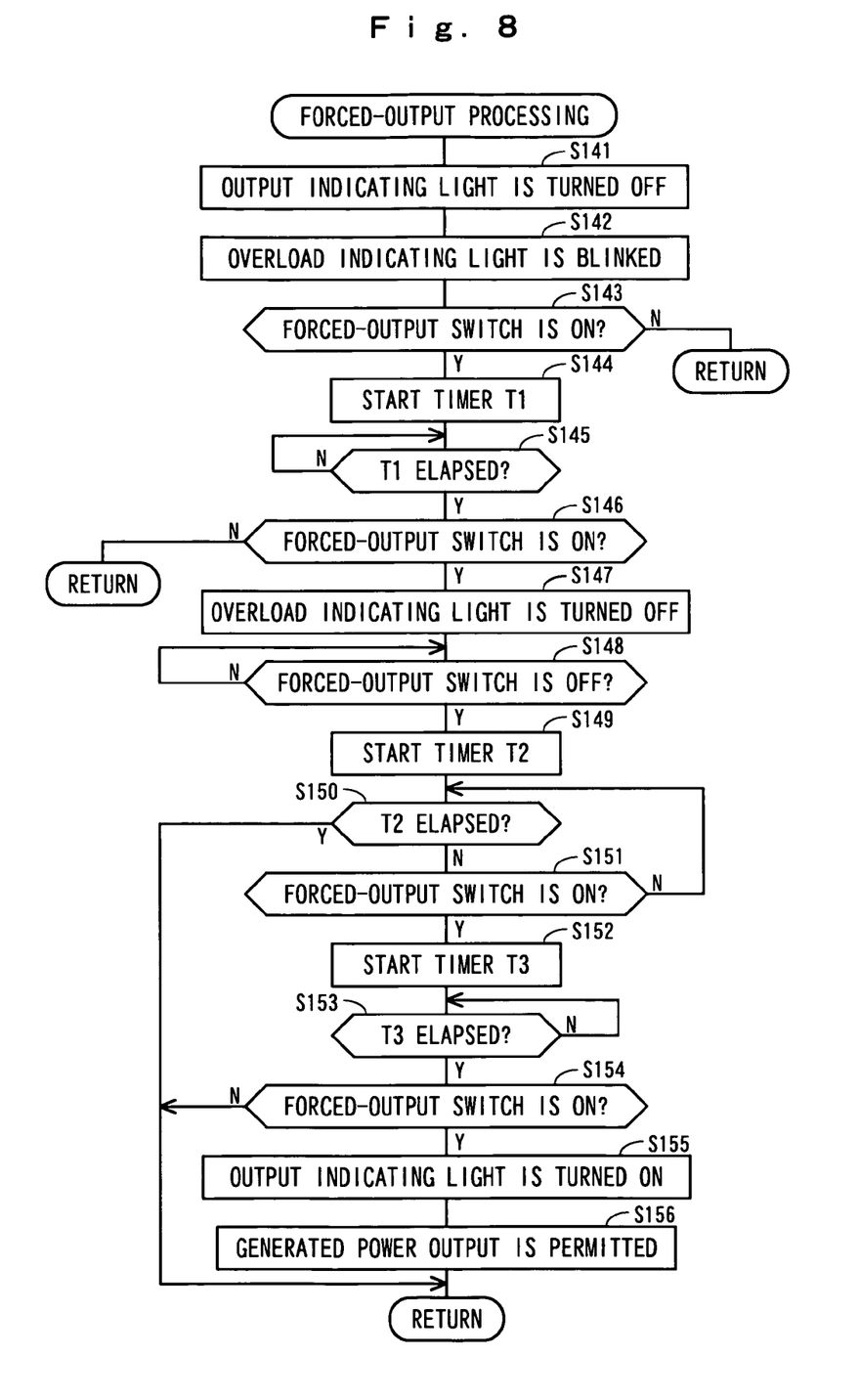
FIG. 8 is a flow chart of a forced output processing.

FIG. 8 is a flow chart of a summarized forced-output processing. At step S141, the output indicating light 26 is turned off and at step S142, the overload light 27 is blinked. At step S143, it is determined whether or not the forced-output switch 37 is turned on. If the forced-output switch 37 is not turned on, this processing is passed and then the routine returns to step S1 in FIG. 6. If the forced-output switch 37 is turned on, the routine proceeds to step S144 where a timer T1 is started. The value of the timer T1 is the above-described first predetermined time, for example, 5 seconds.

At step S145, it is determined whether or not a time T1 counted by the timer T1 passes. If it is determined that the time T1 passes, the routine proceeds to step S146 where it is determined whether or not the forced-output switch 37 is ON. If the judgment result at step S146 is affirmative, it is determined that the forced-output switch 37 is being pressed until the time T1 passes and the overload indicating light 27 is turned off at step S147.

After the overload indicating light 27 is turned off, the routine waits at step S148 that the forced-output switch 37 is turned off (until the judgment result at step S148 is affirmative) and then routine proceeds to step S149 where a timer T2 is started. The value of the timer T2 is the above-described second predetermined time, for example, 5 seconds. At step S150, it is determined whether or not a time T2 counted by the timer T2 passes. Unless the time T2 passes, the routine proceeds to step S151 where it is determined whether or not the forced-output switch 37 is ON.

If the time T2 passes, the routine proceeds to step S152 where a timer T3 is started. A time T3 counted by the timer 3 is the third predetermined time, for example, 5 seconds. At step S153, it is determined whether or not the time T3 passes and if the time T3 passes, it is determined at step S154 whether or not the forced-output switch 37 is ON. If it is determined at step S154 that the forced-output switch 37 is ON, the routine proceeds to step S155 where the output indicating light 26 is turned on and then the generator apparatus is permitted to output generated power at step S156.

In this manner, according to the present invention, by performing predetermined operations as required, even if the load voltage VL does not match the output voltage of the generator apparatus in an optimum range, the generator apparatus can be forcibly permitted to output generated power. In this regard, not only forced output can be made by the two operations of the forced-output switch 37 as described above, but also various kinds of operations can be thought. For example, the number of operations of the forced-output switch 37 may be further increased and the operating time of one operation, that is, the first predetermined time or the third predetermined time may be changed. In short, it is essential only that the number of operations or the operating time should be set such that the operator can provide an instruction by his clear intention, in other words, the operator does not cause an operating error.

In a processing at step S15 when a judgment result at step S2 in FIG. 6 is negative, in other words, when the target value Vref is 48 V, it is determined at step S7 whether or not the load voltage VL is 42 V or more and it is determined at step S8 whether or not the load voltage VL is 55 V or more. Hence, except that the flow chart in FIG. 6 is changed in this manner, the processing is the same as the processing when the target value Vref is 36 V (the judgment result at step S2 is affirmative), so that a flow chart for the processing is omitted and only the results of the processing will be described with reference to FIG. 9.

Figure 9:
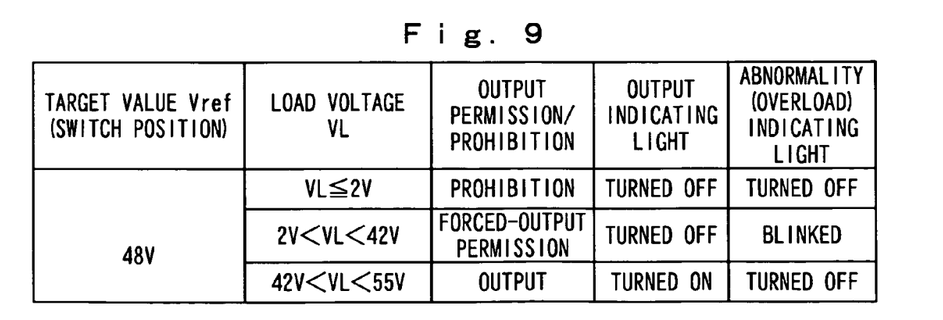
FIG. 9 shows examples of the output of a generator and a display according to a relationship between a load voltage and a set value of output voltage (48 V).

When the target value Vref is 48 V in FIG. 9, in other words, when the selector switch 25 is switched to a 48 V side, the results of the processing are as follows. As shown in the uppermost line in FIG. 9, when the load voltage VL is less than 2 V, power output is prohibited and both of the output indicating light 26 and the overload indicating light 27 are turned off. Further, as shown in the second line in FIG. 9, when the load voltage VL is within a range not less than 2 V and less than 42 V, the output of the generator apparatus, that is, the output of the three-phase rectifier bridge circuit 2 is permitted by the forced-output operation. Then, the output indicating light 26 is turned off and the overload indicating light 27 is blinked to raise an alarm. Still further, as shown in the bottom line in FIG. 9, when the load voltage VL is within a range from 42 V or more to less than 55 V, the output of the three-phase rectifier bridge circuit 2 is permitted. Then, the output indicating light 26 is turned on and the overload indicating light 27 is turned off.

The above-described voltage range is provided in view of the following points. First, as for the battery 19, a plurality of batteries 19 are provided to produce a desired voltage. For example, four unit batteries for 48 V or three unit batteries for 36 V are connected in series. In consideration of life, it is recommended to use the respective unit batteries such that they are not discharged to a level of 10.5 V or less. Hence, the minimum voltage of the usable battery 19 of 48 V is set at 42 V (=10.5 V×4). When the minimum voltage of 42 V is applied to the battery 19 of 36 V including three unit batteries, the voltage by one unit battery is 14 V (=42 V÷3). In short, in the case of the battery 19 of 36 V, if the maximum voltage is 42 V, the voltage by the unit battery is 14 V and hence does not significantly exceed a voltage range (13.6 V) to be charged by the USP 20. Hence, it is determined whether or not the load voltage VL of the battery 19 of 36 V and the battery 19 of 48 V is larger than 42 V.

The minimum voltage (27 V) of the battery 19 of 36 V and the maximum voltage (55 V) of the battery 19 of 48 V is set so that the battery 19 is not sufficiently charged or excessively charged.

The voltage range is preferably determined on the base described above but is not limited to these specific values. In short, when the output voltage can be set by the selector switch, it is essential only that the base voltage range should be set so that the set voltage matches the voltage of the connected load. Further, when both of the voltages do not match each other, an alarm is not only raised by an indicating light but also may be guided by a buzzer or an electronically synthesized sound.

In the present embodiment, the present invention has been described by taking a portable generator apparatus, which has a plurality of power supply units each units includes a winding and a rectifier circuits corresponding to the winding, as an example. However, the present invention is not limited to the number of power supply units. Further, the plurality of rectifier circuits are controlled in synchronization by a single thyristor controlling signal. However, the rectifier circuits are not necessarily controlled by the single thyristor controlling signal but may be controlled by individual thyristor controlling signals.

What is claimed is:

1. A generator apparatus that converts an alternating current outputted from output windings of a generator to a direct current by rectifier circuits to output the direct current to an output terminal, the generator comprising:

selecting means that selects a value of output voltage of the rectifier circuit from previously set values of output voltage;

load voltage detecting means that detects voltage of load connected to the output terminal; and load judgment means that enable to start providing the output of the rectifier circuit when the voltage of load is within a load voltage range set in correspondence with the set value of output voltage, which is selected by the selecting means.

2. The generator apparatus as claimed in claim 1, further comprising a forced-output switch that can forcibly output the direct current to the output terminal when the voltage of load is lower than the load voltage range.

3. The generator apparatus as claimed in claim 2, wherein the forced-output switch is a switch that enable to forcibly provide the output of the rectifier circuit to the output terminal when the voltage of load is a voltage not less than a set value set lower than the load voltage range.

4. The generator apparatus as claimed in claim 2, wherein the forced-output switch is a self-returned press button switch that enable to provide the output of the rectifier circuit to the output terminal by means of a previously set number of operations.

5. The generator apparatus as claimed in any one of claims 1 to 4, further comprising means that raises an alarm when the load judgment means does not judge that the voltage of load is within the load voltage range.

6. The generator apparatus as claimed in claim 1 or claim 2, wherein the output windings are a plurality of windings wound around a single iron core independently of each other and wherein the rectifier circuits include rectifier devices with control terminals disposed in correspondence with the plurality of output windings, further comprising control means that controls an output voltage of each rectifier circuit converges on the set value of output voltage, which is selected as a target value.

7. The generator apparatus as claimed in any one of claims 1 to 4, wherein the load is a battery to be charged.

* * * * *